Dec. 15, 1959 P. F. HAYSE 2,917,027
POWER STEERING MECHANISM AND CONTROL VALVE THEREFOR
Filed Dec. 31, 1956 4 Sheets-Sheet 1

INVENTOR.
Paul F. Hayse
BY
Paul E. Mullendore
ATTORNEY

Dec. 15, 1959 P. F. HAYSE 2,917,027
POWER STEERING MECHANISM AND CONTROL VALVE THEREFOR
Filed Dec. 31, 1956 4 Sheets-Sheet 2

INVENTOR.
Paul F. Hayse
BY
Paul E Mullendore
ATTORNEY

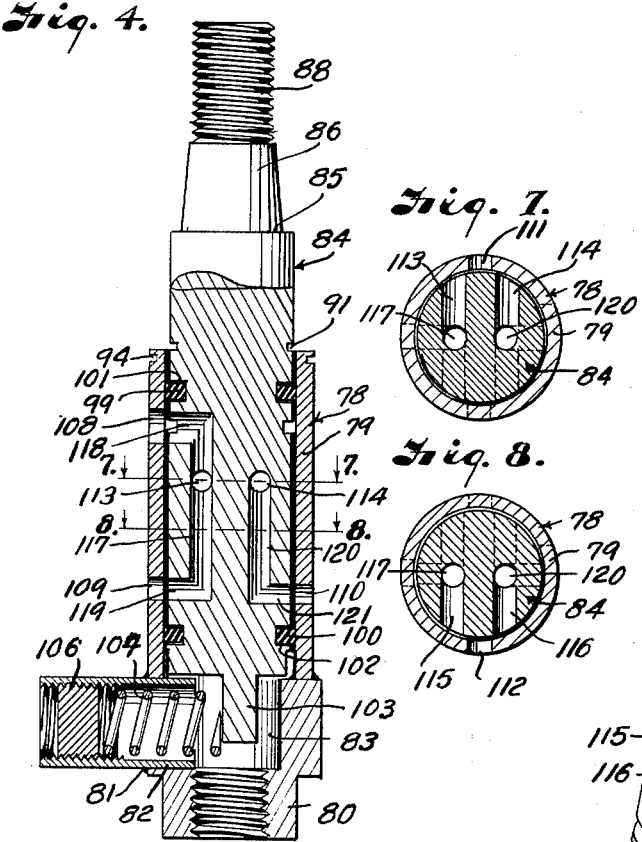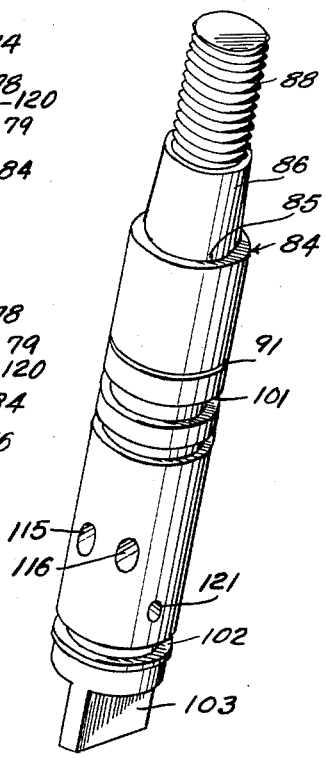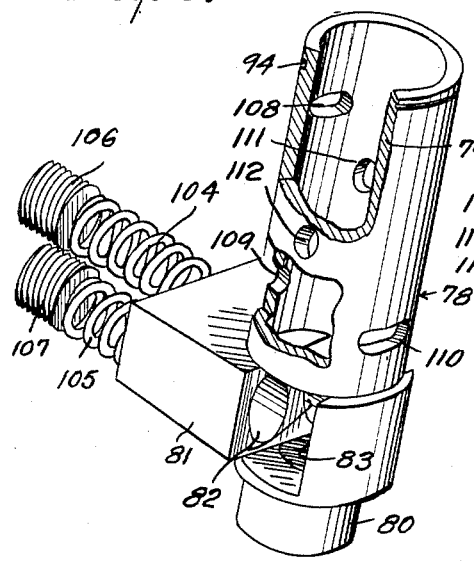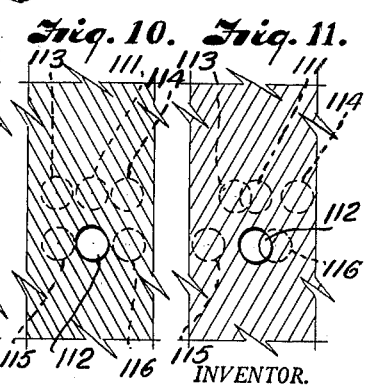

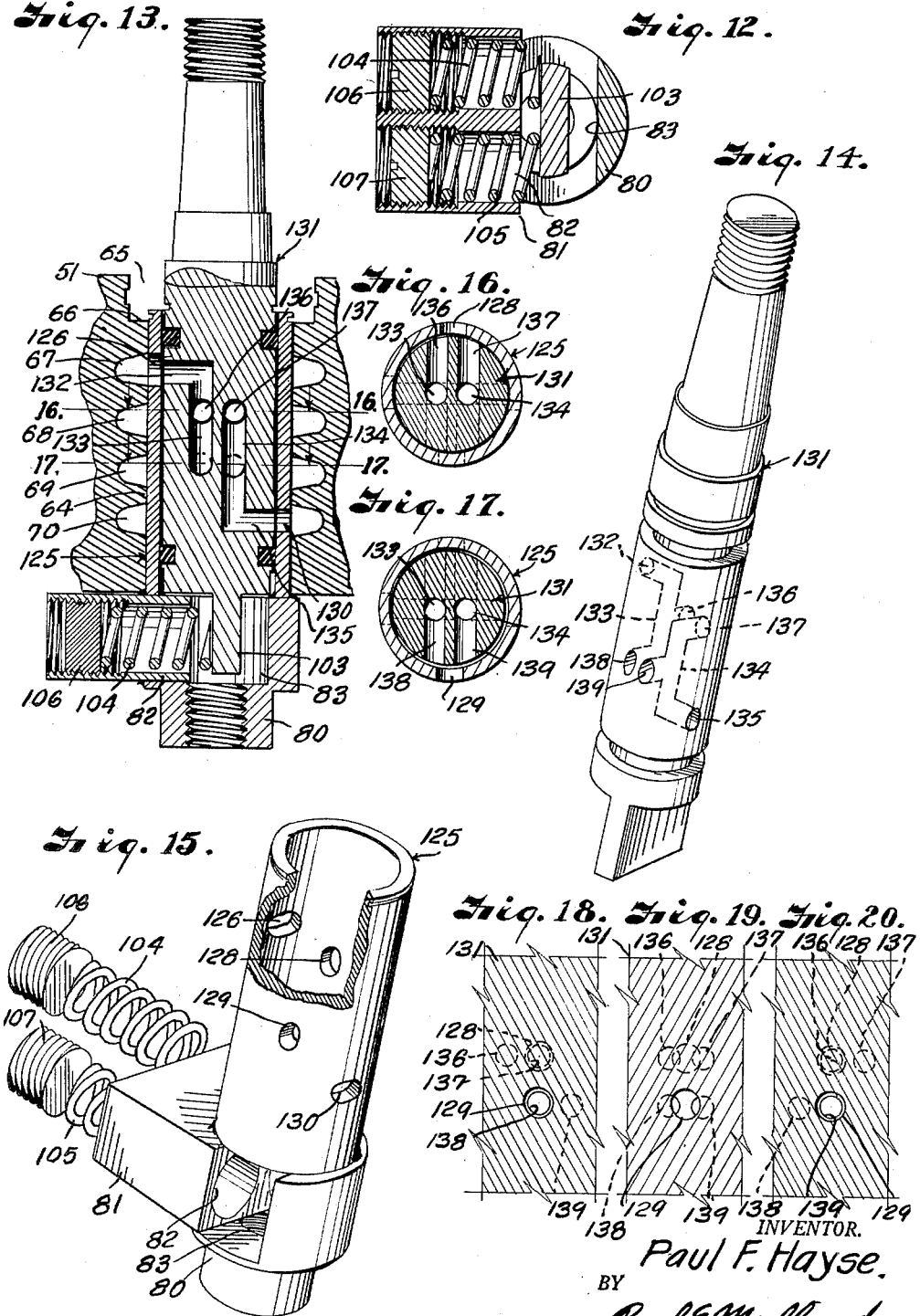

United States Patent Office 2,917,027
Patented Dec. 15, 1959

2,917,027
POWER STEERING MECHANISM AND CONTROL VALVE THEREFOR

Paul F. Hayse, Pratt, Kans., assignor to Power Steering Company, Pratt, Kans., a partnership Application December 31, 1956, Serial No. 631,545

11 Claims. (Cl. 121—41)

This invention relates to a fluid pressure actuated apparatus for steering the wheels of a vehicle and commonly known as a power steering mechanism, the principal objects of the invention being to provide improved power and control units for such mechanisms and whereby the control unit is adapted to be acuated directly from a rotary part of a conventional steering assembly.

Other objects of the invention are to provide directly activated valving elements which are immediately responsive to turning of the steering wheel for controlling flow of pressure fluid to and from the power unit of the steering mechanism; to provide a positively acting control unit which holds the wheels of a vehicle in a firm direction when the steering wheel is stationary, as when making a continuous curve or when traveling in a straightaway direction; and to provide a control mechanism wherein the parts have simple seals to prevent leakage of the pressure fluid.

It is also an object of the invention to provide a control mechanism especially adapted for use on tractors and industrial equipment such as power shovels, loaders, and the like, which are maneuvered into the work and held in a fixed course.

Another object of the invention is to provide a control unit having a rotary ported core element adapted to be connected to a rotary part of a steering mechanism, a relatively movable sleeve element surrounding the core element and having ports cooperating with the ports of the core member to direct flow of pressure fluid to the power unit when the steering wheel is turned and which automatically shifts to neutral position when the steering wheel is stopped to hold a steady course until the steering wheel is again turned to change the course.

A further object of the invention is to provide a control unit adapted for attachment to existing equipment to convert an ordinary manual steering mechanism to power steering.

Another object is to provide a control unit having connections corresponding to the steering wheel and steering shaft connections of a vehicle, whereby the control unit may be readily connected between the steering post shaft and the steering wheel.

Another object of the invention is to provide a power unit for direct connection to the drag link of a steering mechanism.

In accomplishing these and other objects of the invention as hereinafter pointed out, I have provided improved structure, the preferred forms of which are illustrated in the accompanying drawings, wherein:

Fig. 4 is a longitudinal section through the rotary valve and sleeve elements of the control unit as they appear when removed from the casing of the control unit.

Fig. 5 is a perspective view of the sleeve element with the registering springs and adjusting plugs therefor removed and shown in spaced relation.

Fig. 6 is a perspective view of the core element.

Fig. 7 is a horizontal section on the line 7—7 of Fig. 4.

Fig. 8 is a similar section on the line 8—8 of Fig. 4.

Fig. 9 is a diagrammatic view showing the relative position of the valving ports of the sleeve and core elements as when turning the steering wheel in one direction.

Fig. 10 is a similar view when the steering wheel is stationary.

Fig. 11 is a view similar to Fig. 9 but showing the relative position of the ports when the steering wheel is turned in the opposite direction.

Fig. 12 is a horizontal section on the line 12—12 of Fig. 2.

Fig. 13 is a view similar to Fig. 4 but showing a modified arrangement of ports in the sleeve and core elements.

Fig. 14 is a perspective view of the valve core illustrated in Fig. 13.

Fig. 15 is a perspective view of the sleeve element of the valve unit.

Fig. 16 is a horizontal section on the line 16—16 of Fig. 13.

Fig. 17 is a horizontal section on the line 17—17 of Fig. 13.

Fig. 18 is a diagram showing the relative position of the ports in the sleeve and core elements of the type shown in Figs. 13 to 17, inclusive, when the steering wheel is turned in one direction.

Fig. 19 is a similar view showing the relative position of the ports when the steering wheel is held stationary.

Fig. 20 is a similar view showing the relative position of the ports when the steering wheel is turned in the other direction.

Figures 1, 3:
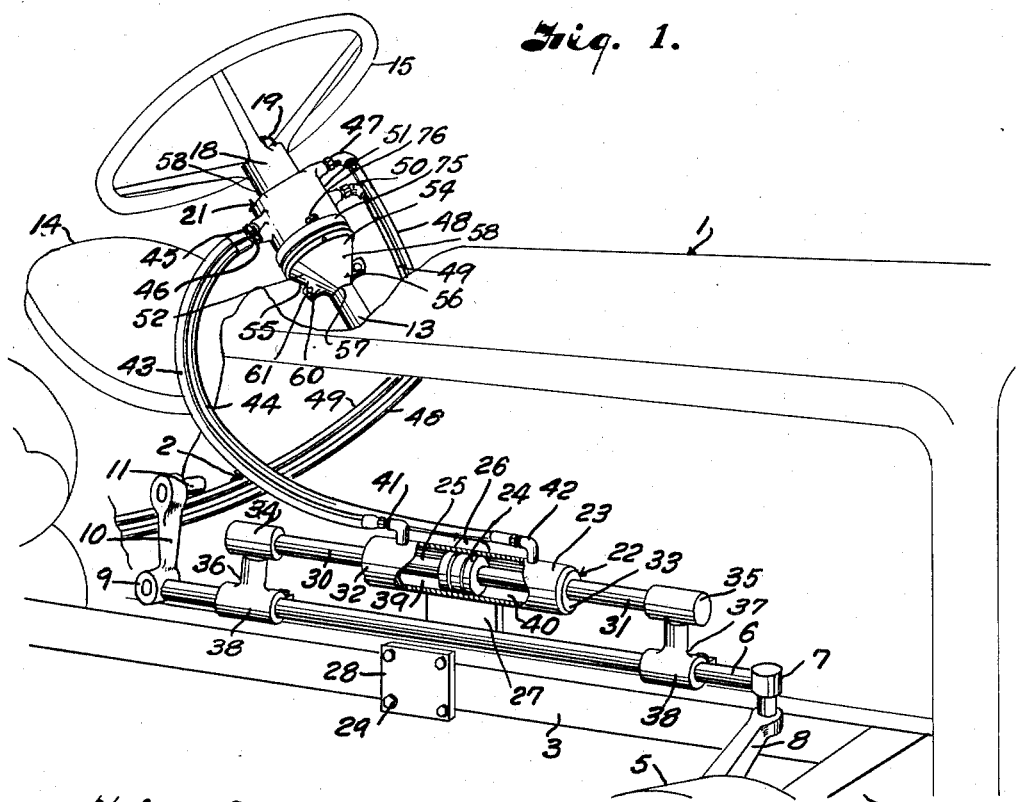
Fig. 1 is a perspective view of a portion of a tractor equipped with a power steering mechanism including a pressure fluid control unit and a power unit embodying the features of the present invention, a portion of the power unit cylinder being in section to illustrate the piston element thereof.
Fig. 3 is a horizontal section on the line 3—3 of Fig. 2.

Referring more in detail to the drawings: 1 designates a vehicle such as a tractor equipped with a power steering mechanism 2 embodying the features of the present invention. The tractor illustrated has a frame member 3, a front axle 4 carrying front wheels 5 that are steered to direct the course of the vehicle by a drag link 6, the forward end being connected by a swivel joint 7 with a steering arm 8. The rear end of the drag link 6 is connected by a swivel joint 9 with an arm 10 fixed to the end of a transverse shaft 11 that is connected through a conventional reduction mechanism (not shown) with a steering post shaft 12. The steering post shaft 12 is rotatably mounted within a steering post column 13 having a fixed position in front of the operator's seat 14. Ordinarily fixed to the steering post shaft 12 is a steering wheel 15. The terminal of the steering post shaft has a portion 16 corresponding to a bore 17 of the hub 18 of the steering wheel 15, with suitable key means being provided to rigidly connect the steering wheel 15 with the shaft 12 and whereby the wheel 15 is retained thereon by means of a nut 19 that is usually mounted on a threaded terminal 20 of the shaft 12 to retain the steering wheel 15 on the shaft 12. It is to be understood that the specific connections of the wheel 15 and shaft 12 are not a part of the present invention, as the connections will vary depending upon the type and make of tractor or other vehicle to be equipped with the power steering mechanism 12 constituting the present invention.

The power steering mechanism 2 includes a control unit 21, a power unit 22, and a source of pressure fluid supply. The pressure fluid supply may be a pump operated by the engine of the tractor or it may be the hydraulic system of the tractor, with which most present day tractors are equipped.

The pressure fluid is supplied through the control unit 21 to actuate the power unit 22, so that turning of the steering wheel 15 to steer the wheels 5 simultaneously manipulates the control unit to effect flow of pressure fluid to and from the power unit in an amount and direction to apply sufficient power to the drag link to take over the main work from the driver, thereby relieving the driver from fatigue of steering the vehicle and holding the wheels in a predetermined course, particularly when the tractor is moved into the work or operating under difficult conditions.

The power unit includes a cylinder 23, a piston 24, and a piston rod 25. The cylinder 23 is carried on a ball joint 26 from a bracket 27 having fixed support on the frame member 3 by means of a clamping plate 28 and bolts 29 that extend through the clamping plate 28 and through a plate portion of the bracket 27 on opposite sides of the member 3. The piston 24 is mounted coaxially on the piston rod 25 at substantially midway of the length thereof, whereby the ends 30 and 31 of the rod extend substantially equally through closed ends 32 and 33 of the cylinder to connect with the drag link 6 through ball joints 34 and 35 with brackets 36 and 37. The brackets 36 and 37 preferably include sleeve portions 38 that are adjustably clamped to the drag link 6, whereby the bracket 27 and brackets 36 and 37 may be adjusted relatively to the drag link 6 and frame 3 to eliminate any tendency for the parts to bind and to provide for free action of the steering mechanism throughout the range of movement of the wheels 5. Ordinarily when the wheels 5 are in a straightaway position, the bracket 27 is clamped to the frame 3 and the brackets 36 and 37 are secured to the drag link 6 so that the piston 24 is midway of the cylinder 23. The piston 24 thus divides the cylinder 23 into pressure chambers 39 and 40.

Pressure fluid is admitted into and exhausted from the respective chambers 39 and 40 to effect movement of the piston 24 in the cylinder 23 and apply the power necessary for turning the steering wheels 5 responsive to manual rotation of the steering wheel 15. The pressure fluid is admitted and exhausted from the chambers 39 and 40 through fittings 41 and 42 that are connected by flexible ducts 43 and 44 to fittings 45 and 46 forming a part of the control unit 21. The pressure fluid is supplied to the control unit through a fitting 47 and duct 48 leading from the source of supply. The pressure fluid is returned from the control unit 21 through a duct 49 that is connected with a fitting 50, the fittings 48 and 50 also forming a part of the control unit 21, as now to be described.

The control unit includes a casing 51 comprising base and head members 52 and 53. The base member 52 comprises two complementary parts 54 and 55, each having a semicircular collar portion 56, provided with a semicircular recess 57, and an outwardly flaring portion 58. The parts have substantially flat contacting faces 59.

The parts forming the base member 52 are placed on the respective sides of the steering column 13, with the end of the column 13 engaging within the semicircular recesses 57, whereby the collar portions are clamped about the post 12 in face-to-face contact by fastening devices such as bolts 60 extending through ears 61 on the respective parts. The parts form an annular seat 62 extending about a recess 63.

The head member 53 carries the fittings 45—46 and 47—50, previously described, and contains the fluid passageways for supplying the valving elements. The head member 53 is preferably formed of a single part and has an axial cylindrical bore 64 extending therethrough in coaxial alignment with the steering shaft 12 and steering wheel 15 when the parts are assembled as later described. The inner end of the bore 64 opens into the recess 63 and the upper end is counterbored as at 65 to provide an annular shoulder 66 extending circumferentially of that end of the bore 64. The bore 64 is encircled at spaced points along the length thereof by annular groves 67, 68, 69 and 70 to form passageways in connection with ports 71, 72, 73 and 74, respectively. The ports 71, 72, 73 and 74 extend radially through the wall of the head member and connect with the fittings previously described through the grooves with which they are related. The port 71 that is joined with the upper groove 67 is connected with the fitting 47 and constitutes the passageway for the high pressure fluid. The port 74 is on the same side of the casing member and connects the lower annular passageway 70 with the fitting 50, whereby the pressure fluid is returned to the source of supply. The ports 72 and 73 are at the opposite side of the bore 64 and connect with the fittings 45 and 46 wherethrough the pressure fluid is admitted and exhausted from the respective ends of the power cylinder 23, as later described.

The head member 53 has an annular flange 75 at the base thereof that seats on the annular seat 62 of the base member and is secured thereto by fastening devices, such as cap screws 76. The bottom end face 77 of the head member 53 thus closes the open upper end of the recess 63 in the base member 52 to cover the terminal 16 of the steering post shaft 12.

The control unit 21 also includes a sleeve element 78 comprising a sleeve-like body 79 of sufficient length to extend from the face 77 upwardly into the counterbore 65 and the lower end thereof is fixed to a nut portion 80 that is turned onto the threaded terminal of the steering post shaft 12 prior to assembly of the casing. The nut portion 80 has a lateral extension 81 forming parallel bores 82 that open into a recess 83 of the nut portion, as best shown in Figs. 5 and 12. The sleeve-like body and nut portions are preferably formed of separate parts welded together to provide a unitary assembly. The sleeve-like body portion 79, when in place in the bore 64, closes the inner sides of the annular grooves 67, 68, 69 and 70. The control unit also has a cylindrical core element 84 extending coaxially through the sleeve element 78 and having an outer diameter snugly fitted within the inner diameter of the sleeve element 78. The core element is of a length to extend from registry with the lower end of the sleeve-like body portion upwardly through the counterbore 65 and to project from the casing to mount the steering wheel 15.

In order to mount the steering wheel, the upper end of the core element 84 is of reduced diameter to form an annular shoulder 85 and a portion 86 corresponding with a bore 17 in the hub 18 of the steering wheel 15, the steering wheel 15 being retained thereon by the nut 19 that is threaded on an externally threaded extension 88 to clamp the hub 18 of the steering wheel against the shoulder 85 and a spacing collar 89, previously sleeved over the projecting portion of the valve element to engage a lock ring 90 which projects from an annular groove 91 formed in the body of the core element a distance above the upper end of the sleeve-like body to accommodate a washer 92 therebetween. A similar retaining washer 93 is preferably carried in an annular groove 94 in the sleeve-like body to engage the shoulder 66 at the bottom of the counterbore. In order to seal the sleeve-like body within the head of the casing, the casing is provided on the outer sides of the endmost annular grooves 67 and 70 with annular grooves 95 and 96 to contain O rings 97 and 98. The sleeve element 78 is also sealed with respect to the core element 84 of the valving mechanism by O rings 99 and 100 that are retained within annular grooves 101 and 102 formed in the core element 84 in outwardly spaced relation with respect to the endmost ports, as shown in Fig. 2.

Figure 2:
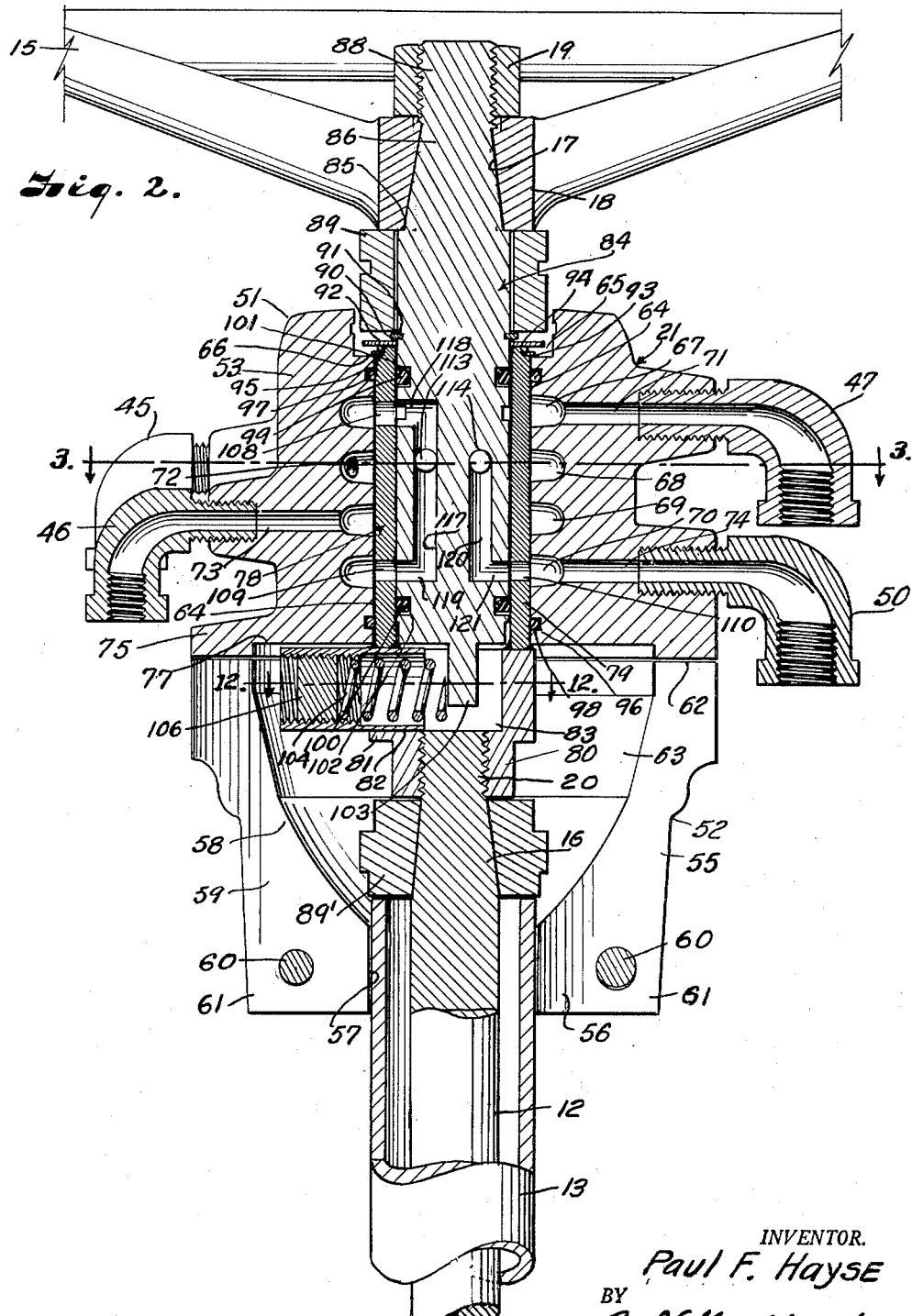
Fig. 2 is an enlarged longitudinal section through the pressure fluid control unit as it appears when installed between the steering post shaft and the steering wheel.

The lower end of the core element 84 has a transverse tongue or lug 103 projecting into the transverse recess 83 and adapted to be engaged by coil springs 104 and 105 contained within the bores 82 under compression by means of plugs 106 and 107 threaded into outer ends of the bores, as shown in Fig. 2. The springs 104 and 105 thus exert pressure on opposite diametrical sides of the axis of the core element 84 and normally retain the core and sleeve elements in one related position when the steering wheel is held to stationary position to make a continuous turn or to keep the tractor moving in a straight-away direction.

The sleeve element has ports 108 and 109 in registry with the upper and lower grooves 67 and 70, respectively. The ports 108 in the sleeve element is slot-like and the sleeve element (see Figs. 2 and 5) also has a slot-like port 110 opposed to the port 109 and also in connection with the grooves 70. Ports 111 and 112 are provided in the respective opposite sides of the sleeve element 78 and in connection with the grooves 68 and 69, respectively.

The core element has oppositely directed pairs of ports 113—114 and 115—116, the pair 113 and 114 being in plane with the annular groove 68 and the pair 115 and 116 in plane with the groove 69.

The ports 113 and 114 are spaced apart a slightly greater distance than the width of the port 111 and the ports 115 and 116 are likewise spaced apart a greater distance than the width of the port 112 in the sleeve member (see Figs. 7 and 8) and are adapted to be alternately connected with the ports 111 and 112 upon turning of the core element 84 within the sleeve element 78, as later described. The ports 113 and 115 are connected by a channel 117 extending longitudinally of the core element and having lateral terminals 118 and 119 for connection with the ports 108 and 109 in the sleeve element. The ports 114 and 116 are connected by a channel 120 having a lateral terminal 121 for connection with the port 110 of the sleeve element (Figs. 2 and 4). When the springs 104 and 105 are bearing equally on the tongue 103 of the core element (see Fig. 12) and the steering wheel is released by the driver, the springs 104 and 105 normally hold the core element in the position shown in Figs. 7 and 8, with the ports 111 and 112 being closed and the tractor traveling in a straightaway course or on a constant curve, as later described.

In the form of the invention illustrated in Figs. 13 to 20, inclusive, the core and sleeve elements of the valve are substantially the same as the core and sleeve elements previously described, except for the porting arrangement. In this form of the invention, the sleeve element 125 has a port 126 that registers with the groove 67 of the casing. The sleeve element also has ports 128 and 129 on opposite diametrical sides thereof and adapted to register with the grooves 68 and 69, respectively. The sleeve element also has a port 130 adapted to register with the lowermost groove 70 of the casing. The core element 131 has a port 132 that is adapted to register with the port 126 and which connects with a longitudinal channel 133 extending downwardly to the plane of the groove 69. The core element 131 also has a longitudinal channel 134 that extends from the plane of the groove 68 downwardly in parallel relation with the channel 133 to connect with the port 130 through a lateral terminal 135. The core element 131 also has an upper pair of ports 136—137 and a lower pair of ports 138—139. The ports 136 and 138 connect with the longitudinal channel 133 and the ports 137 and 139 connect with the longitudinal channel 134. In this form of the invention the ports in each pair of ports are spaced apart so that the ports 136 and 137 are both in connection with the sleeve element port 128 and the ports 138 and 139 are in registry with the port 129 of the sleeve element 125 when the tractor is making a continuous curve or is in a straightaway course, as shown in Figs. 16 and 17. Otherwise the structure is the same as that disclosed in the preferred form of the invention.

In mounting the power unit 22 on a tractor, the wheels 5 are turned to straightforward position. The bracket 27 is attached to the power cylinder 23 by the ball joint 26. The front end swivel joint 7 is removed and the sleeve portions 38 of the brackets 36 and 37 are sleeved over the drag link 6 with the bracket 27 on the back side of the cylinder 23. The swivel joint 7 is replaced and connected with the steering arm 8. The bracket 27 is then bolted to the frame 3 by means of the clamping plate 28 and bolts 29. The piston rod 25 is adjusted so that the ends 30 and 31 project equally from the respective ends 32 and 33 of the cylinder 23. The sleeve portions 38 are then clamped securely to the drag link 6. The wheels 5 are then turned slowly from one extreme position to the other, the movement being carefully noted for obstructions and/or binding of any of the parts. If binding occurs, the brackets 36 and 37 and main bracket 27 are readjusted as necessary.

The control unit 21 is next applied. The nut 19 is removed from the steering wheel shaft 12 to permit withdrawal of the steering wheel 15. A spacing collar 89' is applied to the terminal portion 16 of the steering post shaft to take the place of the steering wheel hub 18. The sleeve and core elements 78 and 84 are placed in the bore 64 of the head member 53 of the casing 51 and the nut 80 of the core element 84 is threaded upon the threaded end 20 of the steering post shaft 12. The spacing collar 89 is then placed on the projecting end of the core element 84, after which the hub 18 of the steering wheel 15 is applied to the portion 86 of the core element 84, after which the cap 19 is applied to the threaded end 88 to retain the steerling wheel 15 against the shoulder 85. The two parts 54 and 55 of the base member of the casing are applied around the steering post column 13 and the bolts 60 are loosely applied to hold the parts together. The base member is shifted to bring the upper face 62 thereof into contact with the under face of the flange 75, after which the screws 76 are applied and tightened to hold the members of the casing together. The two parts of the base member 52 are then tightened on the steering post column by tightening the bolts 60.

The flexible ducts 43 and 44 (Fig. 1) are then connected with the fittings 41 and 42 of the cylinder 23 and to the fittings 45 and 46 of the control unit 21. The flexible duct 48 is then connected with the source of fluid and to the fitting 47. The duct 49 is connected with the fitting 50 and with the source of pressure fluid supply. The source of pressure fluid, as above stated, may be the tractor's hydraulic system or a separate pump operated by the engine of the tractor, as desired.

A control unit having the modified form of valving elements as shown in Figs. 13 to 20, inclusive, is applied in the same manner as the control unit just described.

With the engine in operation and the operator in position on the seat 14, the steering wheel 15 is turned as in the usual way. Turning of the steering wheel 15 turns the core element 84 and steering post shaft 12 for actuating the drag link 6 in turning the wheels 5. However, with the pressure fluid being supplied to the control unit 21, turning of the steering wheel 15 directs flow of the pressure fluid to one or the other ends of the power cylinder 23, depending upon the direction of movement of the steering wheel, to apply power necessary for turning the wheels 5, as now to be described.

The pressure fluid, preferably an oil, is delivered under pressure through the duct 48, fittings 47 and port 71 to the annular passageway 67, where it flows around the sleeve 79 and enters the port 108 to flow through the port 118 and the channel 117. If the steering wheel 15 is being turned to the right, the port 113 of the core element registers with the port 111 of the sleeve element (Fig. 11) and the port 116 registers with the port 112 of the sleeve element 78 so that the fluid under pressure passes through the port 111 and through the passageway 68 to the port 72, from where it flows through the fitting 45 and flexible duct 43 to the pressure chamber 39 in the rear end of the power cylinder 23 to act on the piston 24 and push the piston 24 forwardly, thereby applying power through the piston rod 25 to the drag link 6 to provide the power necessary in turning the wheels 5. Simultaneously, fluid is displaced from the pressure chamber 40 in the front end of the power cylinder 23 through the fitting 42, duct 44, port 73 and annular passageway 69 for discharge through the port 112 of the sleeve element, port 116 of the core element, channel 120, slot 110 of the sleeve element 78, and through the port 74, fitting 50 and duct 49, for return to the source of supply.

It is to be understood that turning of the core 84 first effects connection of the ports thereof with the ports of the sleeve element 78 and then turns the sleeve element 78 through the interconnection effected by the lug or tongue 103 and compression spring 104 so as to hold the ports of the core or valving element 84 in registry with the ports of the sleeve element 78 as long as the steering wheel is in motion in a right hand turn, therefore, the pressure fluid continues to flow to advance the piston 24 toward the forward end of the power cylinder and continue movement of the front wheels 5 under power. When the steering wheel 15 is brought to rest, the compressed spring 104 is effective in reestablishing the relative position of the core and sleeve elements 78 and 84 so that the flow is shut off through the control unit 21 to the power unit 22, thereby resulting in locking the piston from movement in the power cylinder due to the incompressibility of the pressure fluid. Therefore, the wheels 5 are held in the position in which they have been turned. The volume of pressure fluid supplied to the power cylinder 23 is dependent upon the amount of pressure fluid which is bypassed through the channel 117 and port 119 of the core element 84 through the port 109 of the sleeve element 78 into the annular passageway 70 for discharge through the port 74, fitting 50, and the exhaust duct 49. The ports 119 and 109, therefore, constitute the valving elements by which the flow of fluid is controlled to the power unit.

If the steering wheel is turned to the left, the action is the same with the exception that in this instance the port 115 of the core element registers with the port 112 and the port 114 registers with the port 111 (see Fig. 9). The pressure fluid then flows from the annular passageway 67 through the port 108, which is sufficiently large or slot-like so that it registers with the terminal 118 of the channel 117 throughout the relative oscillatory movement of the core element 84 relative to the sleeve element 78. In other words, as long as the steering wheel 15 is in motion in either direction, pressure fluid is being supplied to the channel 117, but since the port 113 is now closed the pressure fluid is diverted to the port 115 of the core element and discharged through the port 112 of the sleeve element 78, annular passage 69, port 73, fitting 46, duct 44, and fitting 42, to the pressure chamber 40 in the front end of the power cylinder 23. Simultaneously, fluid is exhausted from the rear pressure chamber 39 of the power cylinder 23, through the duct 43, port 72, into the annular passageway 68 and through the port 111, port 114, channel 120, exhaust port 110, passage 70, and port 74, for return to the source of supply through the fitting 50 and duct 49 (see Fig. 9).

The slot form of port 110 keeps the exhaust port of the valving element always open. The throttling effect, however, in the flow of fluid to the fluid pressure chambers 39 and 40 of the power cylinder remains under control of the valving effect between the ports 109 and port 119 of the sleeve and core elements, respectively.

With this form of porting arrangement it is obvious that the ports 113 and 115 of the core element are at all times pressure supply ports for supplying pressure fluid to the respective ends of the power cylinder, depending upon the direction of rotation of the steering wheel, and the ports 114 and 116 are always on the exhaust side wherethrough the pressure fluid is displaced from the power unit.

In the form of the invention illustrated in Figs. 13 to 20, inclusive, the flow of pressure fluid is as follows:

Assuming that the steering wheel is turned to the right, the port 136 registers with the port 128 and the port 139 registers with the port 129 (see Fig. 20). Pressure fluid is then supplied from the upper passageway 67 through the port 126, port 132, channel 133, port 136, port 128 and annular passageway 68 to the pressure chamber at the rear end of the power cylinder (Fig. 20). Simultaneously, pressure fluid is flowing from the forward chamber of the power cylinder through the annular passageway 69 to the port 129, port 139 and channel 134 to the port 135, port 130 and passage 70 for discharge to the source of supply. Thus the piston 24 is moved in a forward direction to effect turning of the wheels 5 to the right.

Upon stopping of the steering wheel, the springs are effective in reestablishing neutral position of the core element 131 with respect to the sleeve element 125. Therefore both ports 136 and 137 are in registry with the port 128 and both ports 138 and 139 are in registry with the ports 129 (see Fig. 19). Therefore, pressure fluid is discharged through both ports 128 and 129 in equal volume to the respective ends of the pressure cylinder and the piston in the pressure cylinder remains in the position it has assumed.

To turn the vehicle back to a straightaway course, the steering wheel 15 is turned to the left. This turns the core element 131 within the sleeve element 125 so that the port 136 moves out of registry with the port 128 and the port 137 moves into registry with the port 128. Likewise, the port 138 moves into registry with the port 129 and the port 139 moves out of registry (see Fig. 18). The pressure fluid from the annular passageway 67 passes through the port 126, port 132 and channel 133 to the port 133 and through the port 129 and annular passageway 69 to the pressure chamber 40 in the front end of the power cylinder 23. Simultaneously, pressure fluid is discharged from the pressure chamber 39 in the rear end of the power cylinder 23 to the annular passageway 68, port 128, port 137 and channel 134, to the port 130 and annular passageway 70, from where the fluid is returned to the source of supply.

When the wheels 5 have been returned to a straightaway position, the operator holds the steering wheel 15 stationary, whereupon the core and sleeve members return to the relative position with the ports as shown in Fig. 19, whereby a portion of the pressure fluid is supplied to both ends of the power cylinder and the remaining portion is bypassed for return to the source of supply.

In this form of the invention, it is obvious that the ports 128 and 129 of the sleeve element cooperate with the pairs of ports 136—137 and 138—139 to constitute the valving means for controlling flow to and from the pressure cylinder.

From the foregoing it is obvious that I have provided an improved power and control unit adapted for ready installation, and which units are positive in operation and immediately responsive to turning of the steering wheel. It is also obvious that steering is under complete and immediate control of the operator through merely directing the pressure fluid. It is also obvious that when the steering wheel 15 is held stationary, the wheels 5 are held under power in whatever position they have been previously turned until the position has been changed responsive to further turning of the steering wheel or turning the steering wheel in the opposite direction. It is also obvious that the present invention is particularly suitable for tractors and other industrial equipment, such as power shovels, loaders and the like, which must be maneuvered into the work and held in a fixed course.

What I claim and desire to secure by Letters Patent is:

1. A power steering control valve including a stationary casing having a bore and provided with fluid inlet and exhaust connections and fluid outlet connections spaced circumferentially about said bore, said casing having annular grooves encircling the bore and each having communication with a respective fluid connection, a sleeve element rotatable in said bore and having ports in connection with said annular grooves, a rotatable core element relatively oscillatable within the sleeve element and having ports adapted for connection and disconnection with the ports of the sleeve element when the core element is oscillated with respect to the sleeve element for regulating flow of pressure fluid from the inlet connection to one and the other of said outlet connections and returning the fluid alternately through one and the other of said fluid outlet connections to the exhaust connection depending upon the direction of rotation of the core element, a lug extending transversely of the core element and adapted to engage part of the sleeve element on opposite sides of the axis of rotation for limiting relative oscillation of the core and sleeve elements whereby the sleeve element rotates with the core element to maintain said controlling relation of the ports of the core element with the ports of the sleeve element, and a pair of springs carried by the sleeve element and engaging the lug on opopsite diametrical sides of the core element for reestablishing relative position of said elements upon stopping rotation of the core element.

2. A power steering control valve including a stationary casing having a bore and provided with fluid inlet and exhaust connections and fluid outlet connections spaced circumferentially about said bore, said casing having annular grooves encircling the bore and each having communication with a respective fluid connection, a sleeve element rotatable in said bore and having ports in connection with said annular grooves, a rotatable core element relatively oscillatable within the sleeve element and having ports adapted for connection and disconnection with the ports of the sleeve element when the core element is oscillated with respect to the sleeve element for regulating flow of pressure fluid from the inlet connection to one and the other of said outlet connections and returning the fluid alternately through one and the other of said fluid outlet connections to the exhaust connection depending upon the direction of rotation of the core element, a lug extending transversely of the core element and adapted to engage part of the sleeve element on opposite sides of the axis of rotation for limiting relative oscillation of the core and sleeve elements whereby the sleeve element rotates with the core element to maintain said controlling relation of the ports of the core element with the ports of the sleeve element, a pair of springs carried by the sleeve element and engaging the lug on opposite diametrical sides of the core element for reestablishing relative position of said elements upon stopping rotation of the core element, and means for adjusting relative action of said springs to control valving action of the ports in the core and sleeve elements.

3. A power steering control valve including a stationary casing having a bore and provided with fluid inlet and exhaust connections and fluid outlet connections spaced circumferentially about said bore, said casing having annular grooves encircling the bore and each having communication with a respective fluid connection, a sleeve element rotatable in said bore and having ports in connection with said annular grooves, a rotatable core element relatively oscillatable within the sleeve element and having ports adapted for connection and disconnection with the ports of the sleeve element when the core element is oscillated with respect to the sleeve element for flow of pressure fluid from the inlet connection to one and the other of said outlet connections and returning the fluid alternately through one and the other of said fluid outlet connections to the exhaust connection depending upon the direction of rotation of the core element, said core element having a bypass to the exhaust connection including valving ports in the core and sleeve for effecting the required valving action on the pressure fluid supply to the outlet connection, means for limiting relative oscillation of the core and sleeve elements whereby the sleeve element rotates with the core element to maintain said valving action of the last named ports and flow through the other of said ports of the core and sleeve elements.

4. In an apparatus of the character described, a stationary member provided with inlet and exhaust connections and alternate fluid outlet connections, a sleeve member rotatable in the stationary member and having ports adapted to connect with said connections, a rotatable member having ports for connection with the ports of the sleeve member, a steering wheel connected with the rotatable member for oscillating the rotatable member within the rotatable sleeve member for connection and disconnection of the ports of the rotatable member with certain ports of the sleeve member for regulating flow of pressure fluid from the inlet connection to one and the other of the outlet connections and for returning the fluid alternately through one and the other of the other fluid outlet connections to the exhaust connection depending upon the direction of rotation, integrating means between said sleeve member and the rotatable member for limiting relative oscillation, and springs between said integrating means for restoring the relative neutral position of said rotary members.

5. A power steering control valve of the rotary type for controlling flow of pressure fluid to and from a power mechanism, said control valve including a stationary casing having an axial bore and provided with fluid inlet and exhaust connections and fluid outlet connections spaced circumferentially about said bore and along the length thereof to connect respectively with internal annular inlet, exhaust and outlet grooves encircling the bore, a sleeve element rotatable in said bore and having radial inlet, exhaust and outlet ports in connection with the corresponding annular grooves, a rotatable core element relatively oscillatable within the sleeve element and having spaced apart internal passages extending parallel with the rotational axis of the sleeve member, one of said internal passages having a lateral port in constant connection with the inlet port of said sleeve element and the other a lateral port in constant connection with the exhaust port of said sleeve element, said passages also having pairs of lateral ports adapted to be alternately registered with the outlet ports in the sleeve element when the core element is oscillated within the sleeve element for regulating flow of pressure fluid from the inlet connection to one and the other ports of one pair of ports for alternate flow to one or the other outlet connections and for returning the fluid through one and the other port of said other pair of ports to the exhaust connection and adapted to provide a fluid lock of the power mechanism when the sleeve and core elements are in one relative position, said sleeve and core elements having means for exhausting the pressure fluid in said one relative position, and interengaging means on the core and sleeve elements for limiting relative oscillation of the core and sleeve elements whereby the sleeve element is caused to rotate with the core element to maintain control of the fluid during rotation of the core element and to return the elements to said one relative position.

6. A power steering control valve of the rotary type, including a stationary casing having an axial bore and provided with fluid inlet and exhaust connections and fluid outlet connections spaced circumferentially about said bore and along the length thereof to connect respectively with internal annular inlet, exhaust and outlet grooves encircling the bore, a sleeve element rotatable in said bore and having radial inlet, exhaust and outlet ports in connection with the corresponding annular grooves, a rotatable core element relatively oscillatable within the sleeve element and having spaced apart internal passages extending parallel with the rotational axis of the sleeve member, one of said internal passages having a lateral port in constant connection with the inlet port of said sleeve element and the other a lateral port in constant connection with the exhaust port of said sleeve element, said passages also having pairs of lateral ports adapted to be alternately registered with the outlet ports in the sleeve element when the core element is oscillated within the sleeve element for regulating flow of pressure fluid from the inlet connection to one and the other ports of one pair of ports for alternate flow to one and the other outlet connections and for returning the fluid through one and the other port of said other pair of ports to the exhaust connection, said sleeve element also having a second exhaust port for connecting a lateral port in the passage which connects with the inlet port of the sleeve element for bypassing fluid to the exhaust connection when the lateral ports of the passages are out of registry with said outlet ports of the sleeve element and adapted to close upon opening of the outlet ports to maintain uniform pressure of the fluid through said outlet ports, and interengaging means on the core and sleeve elements for limiting relative oscillation of the core and sleeve elements whereby the sleeve element is caused to rotate with the core element to maintain control of the fluid during rotation of the core element.

7. A power steering control valve of the rotary type, including a stationary casing having an axial bore and provided with fluid inlet and exhaust connections and fluid outlet connections spaced circumferentially about said bore and along the length thereof to connect respectively with internal annular inlet, exhaust and outlet grooves encircling the bore, a sleeve element rotatable in said bore and having radial inlet, exhaust and outlet ports in connection with the corresponding annular grooves, a rotatable core element relatively oscillatable within the sleeve element and having spaced apart internal passages extending parallel with the rotational axis of the sleeve member, one of said internal passages having a lateral port in constant connection with the inlet port of said sleeve element and the other a lateral port in constant connection with the exhaust port of said sleeve element, said passages also having pairs of lateral ports adapted to be alternately registered with the outlet ports in the sleeve element when the core element is oscillated within the sleeve element for regulating flow of pressure fluid from the inlet connection to one and the other ports of one pair of ports for alternate flow to one and the other outlet connections and for returning the fluid through one and the other port of said other pair of ports to the exhaust connection, said sleeve element also having a second exhaust port for connecting a lateral port in the passage which connects with the inlet port of the sleeve element for bypassing fluid to the exhaust connection when the lateral ports of the passages are out of registry with said outlet ports of the sleeve element and adapted to close upon opening of the outlet ports to maintain uniform pressure of the fluid through said outlet ports, a lug extending transversely of one end of the cone element, a shaft connector fixed to the end having a recess for containing the lug and having parallel lateral bores intersecting the recess, and springs in said lateral bores bearing against the lug to yieldingly retain the core element in a position normally closing the outlet ports.

8. A power steering control valve as described in claim 1 in which the ports in the core element have an arrangement relatively to the ports of the sleeve element to supply pressure fluid simultaneously to both of said outlet connections and to exhaust excess fluid through the exhaust connection when the springs reestablish said relative position of the core and sleeve elements upon stopping rotation of the core element.

9. A power steering control valve as described in claim 2 in which the ports in the core element have an arrangement relatively to the ports of the sleeve element to supply pressure fluid simultaneously to both of said outlet connections, and to exhaust excess fluid through the exhaust connection when the springs reestablish said relative position of the core and sleeve elements as regulated by said spring adjusting means.

10. An apparatus as described in claim 4 in which the ports in the sleeve member that connect with the alternate fluid outlet connections have common connections through ports of the rotatable member with the inlet and exhaust connections when the said rotary members are in said neutral position for supplying pressure fluid to both outlet connections and excess fluid to the exhaust connection in said neutral position.

11. A power steering apparatus as described in claim 5 wherein said pairs of ports in the core element have a spacing relatively to width of the outlet ports of the sleeve element to provide common connections between the ports of each pair of ports when the elements are in said one relative position to simultaneously supply pressure fluid to both of said outlet connections for creating said fluid lock of the power mechanism and to discharge excess pressure fluid to the exhaust connection.

References Cited in the file of this patent

UNITED STATES PATENTS

| 1,639,285 | Bragg et al. | Aug. 16, 1927 |
| 1,657,412 | Schneider | Jan. 24, 1928 |
| 1,947,973 | Davis | Feb. 20, 1934 |
| 2,349,641 | Tucker et al. | May 23, 1944 |
| 2,362,930 | Robbins | Nov. 14, 1944 |
| 2,368,135 | Hamill | Jan. 30, 1945 |
| 2,608,263 | Garrison | Aug. 26, 1952 |
| 2,640,322 | Puerner | June 2, 1953 |
| 2,730,075 | Edge et al. | Jan. 10, 1956 |
| 2,827,975 | Brand | Mar. 25, 1958 |
| 2,827,976 | Brand | Mar. 25, 1958 |